United States Patent [19]

Uemura

[11] Patent Number: 5,687,148
[45] Date of Patent: Nov. 11, 1997

[54] OPTICAL DISK HAVING BOTH CONSTANT LINEAR AND CONSTANT ANGULAR VELOCITY RECORDING REGIONS AND OPTICAL DISK RECORDING SYSTEM

[75] Inventor: Yutaka Uemura, Yokohama, Japan

[73] Assignee: Nippon Columbia Co., Ltd., Kawasaki, Japan

[21] Appl. No.: 629,338

[22] Filed: Apr. 8, 1996

Related U.S. Application Data

[62] Division of Ser. No. 357,200, Dec. 13, 1994.

[30] Foreign Application Priority Data

Dec. 15, 1993 [JP] Japan .................. 5-343054

[51] Int. Cl.$^6$ .......................................... G11B 7/00
[52] U.S. Cl. .................. 369/50; 369/54; 369/58; 369/59; 369/47
[58] Field of Search .................. 369/54, 58, 47, 369/48, 49, 50, 59, 60, 124, 32, 275.3

[56] References Cited

U.S. PATENT DOCUMENTS 4,558,375  12/1985  Sontheimer .
4,660,189  4/1987  Tsukamura et al. ............ 369/32
4,815,063  3/1989  Aoshima et al. .............. 369/50

FOREIGN PATENT DOCUMENTS 2-56750   2/1990   Japan .
2-10482   3/1990   Japan .
5-303826  11/1993  Japan .
5-44927   11/1993  Japan .

Primary Examiner—Muhammad N. Edun
Attorney, Agent, or Firm—Young & Thompson

[57] ABSTRACT

An optical disk having both CLV and CAV control regions is recorded by a recording system that allows moving from CLV control to CAV control without interrupting the data stream. The switching is accomplished by a switching device selecting between the output of a CAV control signal generator that is equipped with a divider which sets a certain number of frames or sectors for each single rotation of the disk and the output of a CLV control signal generator, a detector that detects whether the frequency and phase of the output of the signal generator of the drive motor and the control signal not selected by the switching device match, and the output of this detection means.

2 Claims, 4 Drawing Sheets

CLV Region
CAV Region
CLV Region

OPTICAL DISK HAVING BOTH CONSTANT LINEAR AND CONSTANT ANGULAR VELOCITY RECORDING REGIONS AND OPTICAL DISK RECORDING SYSTEM

This application is a division of application Ser. No. 08/357,200, filed Dec. 13, 1994, and pending.

BACKGROUND OF THE INVENTION

1. Field of the Invention

This invention relates to optical disks and optical disk recording systems.

2. Description of Related Art

Among optical disk rotational control formats are the Constant Angular Velocity (hereinafter CAV) and the Constant Linear Velocity (hereinafter CLV) control formats. Of these formats, the CLV control format is used more frequently for optical disks such as Compact Discs (hereinafter CDs), because a larger volume of information can be recorded using the CLV format than is possible with the CAV format.

In the CLV format, the relationship between the linear velocity V and the number of disk rotations M per unit time interval is given by:

$$M = V/2\pi r$$

where r is the distance from the center of the disk to the recording position. Accordingly, in order to keep the linear velocity V constant on the optical disk, the CLV control format specifies that the rate of disk rotation is controlled by detecting the recording positions and plugging that value into the above equation with the desired linear velocity V to calculate and obtain the corresponding rate M of disk rotation.

FIG. 7 shows an example of a conventional optical disk recording device. The output of the oscillator 1 is divided by the variable divider 2, and is applied, via the frequency control circuit 6, to the drive motor 7 that causes the optical disk to rotate. The output of the function generator 8 is a function of the number of rotations of the drive motor 7, and is applied to the frequency control circuit 6 to control the number of rotations of the disk. In addition, the output of the recording position detector 9 and the linear velocity setting device 12 are input into the microprocessor 10 which computes a division rate to thereby control the division rate of the variable divider 2. In this manner, the linear velocity V of the optical disk is controlled and kept constant.

With optical disks recorded using the CLV control format, independent dedicated regions recorded using the CAV control format exist at the outer and inner circumferences outside the information area of the optical disk. These dedicated regions using the CAV control format allow to recognize between recording disk numbers, lot numbers, and related information. Differentiation between disks is thus accomplished by viewing the disk's recording number and lot number.

Because CAV regions were to be interspersed on parts of an optical disk recorded in the CLV control format, it would become impossible to record in such a way that the lead sectors are aligned in the radial direction. This is because the number of sectors that exist on each track cannot be made to be integers by simply switching from a CLV control signal to a CAV control signal. In addition, if both the frequency and phase of control signals were to be made to correspond to one another when switching from the CLV control format to the CAV control format, and if the drive motor is locked for an transient period of time, then changes in the linear velocity of the optical disk must be prevented.

While both CLV and CAV control formats exist, a recording system for mixing CAV regions on an optical disk recorded using the CLV control format has yet to be proposed.

Likewise, up to the present, no method for recording an optical disk in both formats without losing continuity of the data stream exists.

It therefore follows that optical disks or CDs having recording regions recorded using both control formats have not, until this disclosure, been described.

SUMMARY AND OBJECTS OF THE INVENTION

It is therefore a principal object of this invention to fill the above-described voids and to provide an optical disk having both CLV regions and CAV regions.

It is another object of this invention to provide a method for recording optical disks or CDs using both control formats while maintaining the continuity of the data stream.

It is a still further object of this invention to disclose a system for recording optical disks using both control formats and for switching reliably from a CLV control format to a CAV control format and vice versa.

For this purpose, according to the present invention, continuous arrangement is made of one or more constant linear velocity CLV regions, and one or more constant angular velocity CAV regions on an optical disk containing rows of spiral recording marks. The optical disk recording system according to the present invention comprises a reference oscillator, a constant linear velocity CLV control signal produced by means of a variable frequency divider which variably divides the output of the reference oscillator; a constant angular velocity CAV control signal produced by means of a divider which establishes a fixed number of frames or sectors for each signal revolution; the output of the modulator which outputs the channel bit clock; first and third format exchange switches which switch between the CAV control signal and the CLV control signal, a second format exchange switch which switches between the linear velocity data; an optical disk drive motor which is rotationally controlled by a control signal selected by the first format exchange switch; a microprocessor which controls the variable divider and which calculates the division ratio by means of the linear velocity data selected by the second format exchange switch and the output of the recording position detector; and a frequency and phase detector which detects when the control signal selected by the third switch and the output signal of the function generator of the drive motor have the same phase and frequency. Switching from the CLV control format to the CAV control format, or vice versa, is accomplished by means of this frequency and phase detector which controls the first, second and third switches in order to record the data in different formats on the disk.

According to the present invention, while maintaining continuity of the data stream, switching from the CLV regions to the CAV regions, or vice versa, can be accomplished without interrupting the data stream. In addition, in the CAV region, the lead sector of each track is aligned in the radial direction.

Therefore, according to the present invention, as the CLV control format is used as the rotational control format, even if data recorded by means of the CAV control format is continuously affixed to the optical disk, or the reverse, data can be recorded by means of CAV region from the CLV region, all the while maintaining the continuity of the data stream. Detection of the CLV control region may be accomplished from the CAV region because, in CAV regions, the lead sector of each track is always aligned in the radial direction.

BRIEF DESCRIPTION OF THE DRAWINGS

The above and other objects and advantages of the invention will be more apparent from the following detailed description of several preferred embodiments thereof, taken with reference to the accompanying drawings, in which.

DETAILED DESCRIPTION OF PREFERRED EMBODIMENTS

Figure 1:
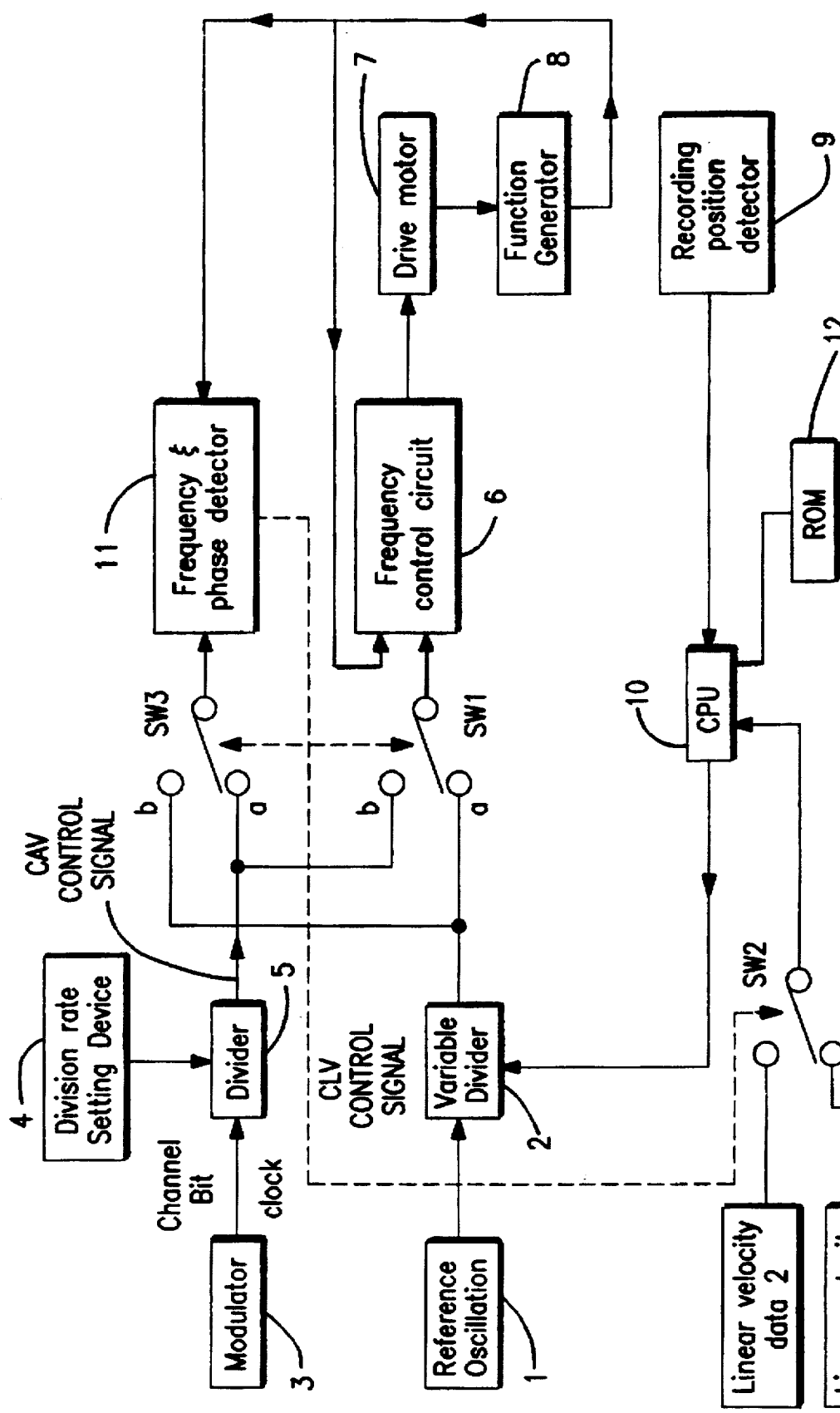
FIG. 1 is a simplified block diagram showing an embodiment of an optical disk recording device according to the present invention.

FIG. 1 is a block diagram of an embodiment of an optical disk recording device according to the present invention. The CLV control signal is produced when the output of the reference oscillator 1 is divided by the variable divider 2. The CAV control signal is produced when the channel bit clock output from the modulator 3 is divided by the divider 5 based upon the output of the division rate setting device 4 in order to achieve an integer number of sectors for each rotation of the optical disk.

Selection between the CAV control signal and the CLV control signal is accomplished by switch SW1 which switches between the two control signals. The selected signal is input to the frequency control circuit 6 which feeds its output to the drive motor 7, which rotates the disk. The output of the function generator 8, which is output in response to the number of rotations of the drive motor 7, is fed back to the frequency control circuit 6 controlling the rotation of the drive motor 7 and to the frequency and phase detector 11.

In order to perform CLV control, the linear velocity data, selected by switch SW2 from among at least one linear velocity data, and the radial position data of the recording head from the recording position detector 9, are input into the microprocessor 10, which controls the division rate of the variable divider 2, thus fixing the linear velocity of the rotations of the optical disk.

Furthermore, switch SW3 selects whichever of the CLV control signal and the CAV control signal that was not selected by switch SW1. The signal selected by the switch SW3 is compared with the output signal of the function generator in the frequency and phase detector 11. The frequency and phase detector 11 outputs an exchange format signal to switches SW1, SW2, and SW3 whenever the frequency and phase of both signals match.

Figure 2:
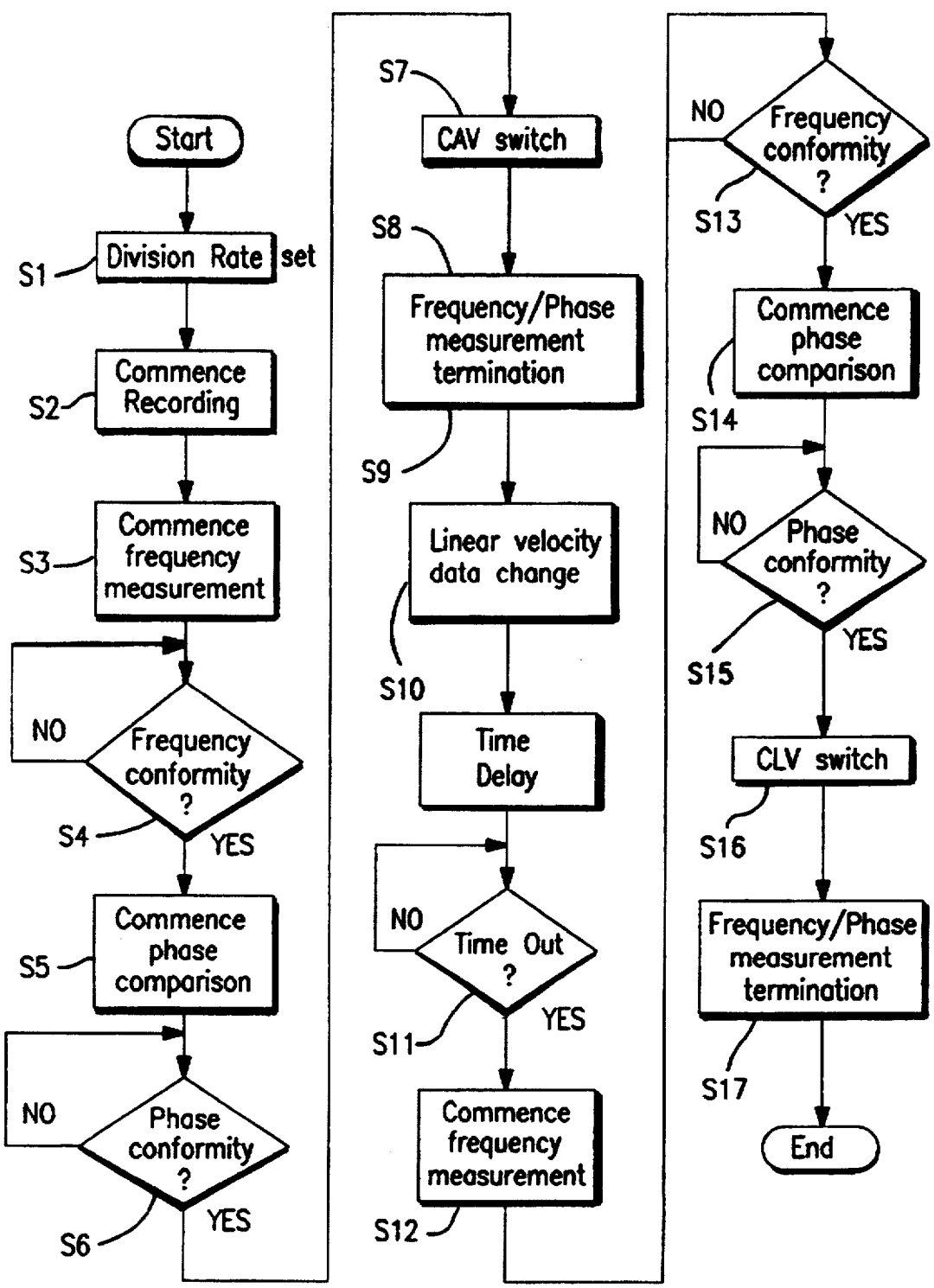
FIG. 2 is a flow chart showing an embodiment of the recording process of the optical disk recording device according to the present invention.

A description is provided hereafter regarding the process of switching to the CAV control format in the middle of recording on a disk using the CLV format, and also regarding the process of returning to the CLV control format after recording in the CAV control format. Reference will be made to the flow chart of FIG. 2, the linear velocity data of FIG. 3, the frequency measurement data of FIG. 4, and the phase measurement data of FIG. 5. Switches SW1, SW2 and SW3 in FIG. 1 are all assumed to be in the "a" positions.

After power on, in step S1, a certain integer number of sectors per one rotation to be recorded in the CAV control region is set in the division rate setting device 4. In step S2, recording using CLV control format is started in the optical disc. In step S3, a frequency measurement of the CAV control signal and the CLV control signal of the linear velocity data 1 is started. In step S4, a judgment is made as to whether the frequencies of the CLV control signal and the CAV control signal match. In step S5, if the frequencies match, a comparison of the phase of both control signals is started. In step S6, it is determined whether or nor the phases match. In step S7, if the phases match, the switches SW1 and SW3 are controlled to switch and the CAV control signal is selected. In step S8, the frequency and phase measurements are stopped. In step S9, the switch SW2 is switched to select the linear velocity data 2. Switching back to the CLV control format from the CAV control format is accomplished as follows. Step S10 is a time delay to prevent errors. After the time delay of step S10 has elapsed, in steps S11 and S12, a frequency measurement of the CAV control signal and the signal which accomplishes the CLV control signal by means of the linear velocity data 2 is started. In step S13, a judgment is made as to whether both of the frequencies match. If, in step S14, the frequencies match, a comparison of the phases of both the control signals is immediately started. In step S15, a determination is made as to whether or not the phases match. If, in step S16, the phases do match, switches SW1 and SW3 are caused to switch to select the CLV control signal. In step S17, the frequency and phase measurements are stopped, signaling the end of the above-described process.

In this manner, the change from the region controlled by the CLV control to the region controlled by the CAV control, and vice versa, is carried out.

Next, the method for calculating the number of rotations of the drive motor 7 in order to obtain the established number of sectors per single rotation of the drive motor 7 for the CAV control signal is described.

The compact disc channel bit rate, the rate at which data is read from the disk, is 4.3218 million bits per second. All data on a compact disc is formatted by frames, which are the smallest complete section of recognizable data on a disc. Each frame consists of 588 channel bits, and one sector consists of 98 frames. Therefore, one sector corresponds to 13.3 milliseconds.

For example, where 20 sectors are recorded for each single rotation of the optical disk, the time required for the drive motor 7 to rotate once is $13.\overline{3} \times 20 \cong 267$ ms, resulting in a frequency of rotation of $f=1/0.267 \text{ s} \cong 3.75$ rotations per second.

Figure 3:
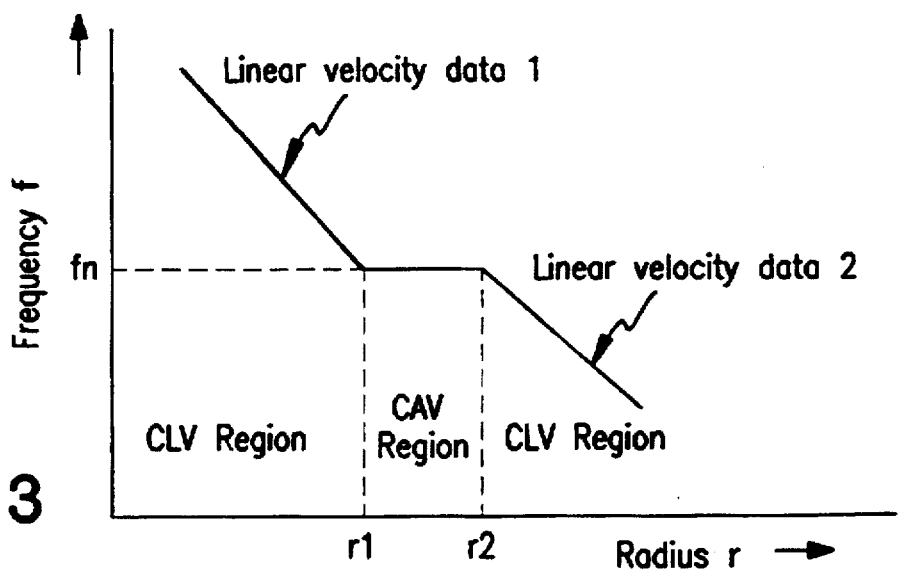
FIG. 3 is a diagram depicting the relationship between the rotational frequency and the radius on an optical disk recording device according to the present invention.

On the other hand, using the CLV control signal, with the linear velocity V fixed at 1.25 meters per second and the rotational frequency f of the drive motor set at 3.75 rotations per second, using the relationship $$V = 2\pi r f$$

where r is the distance between the center of the disk and the recording position, the radius r=53.0516477 mm is calculated. This makes it possible to switch to a 20-sector recording region controlled by CAV control, from the linear velocity data 1 region controlled by CLV control, as shown in FIG. 3. A similar calculation is possible when the switch is made from a region controlled by CAV control to a region controlled by CLV control having a linear velocity data 2 that is a larger value than the linear velocity data 1. The calculation of the radius of the switched position is possible when switching from CAV region to CLV region, as well as when switching from CLV region to CAV region.

Figure 4:
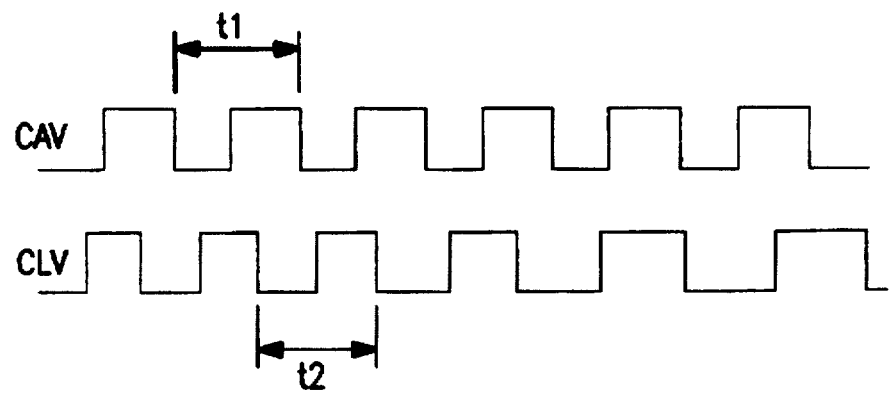
FIG. 4 is a timing diagram of the frequency measurement data of an optical disk recording device according to the present invention.
Figure 5:
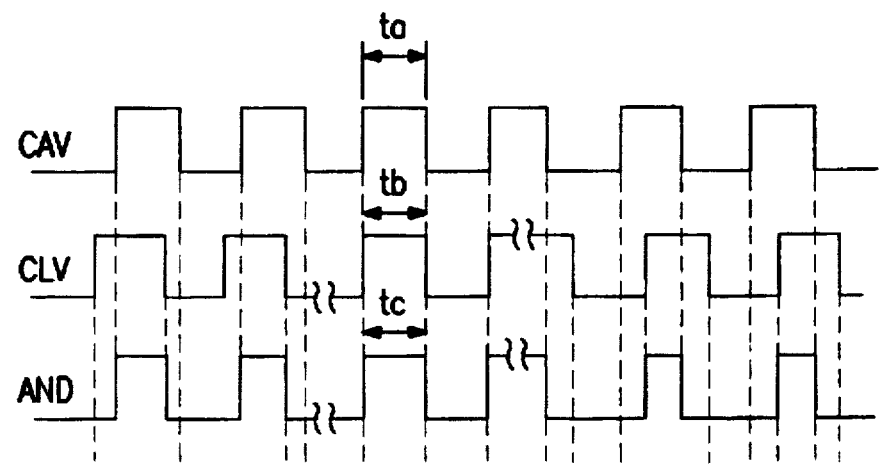
FIG. 5 is a timing diagram of the phase measurement data of an optical disk recording device according to the present invention.

A description of the detection method used by the frequency and phase detector 11 will now follow, with reference to FIGS. 4 and 5.

FIG. 4 is a timing diagram showing the frequency measurement data of the optical disk recording device according to the present invention. FIG. 5 is a timing diagram showing the phase measurement data of the optical disk recording device according to the present invention. In FIG. 4, time period t1 is one period of the CAV control signal selected by switch SW3, and time period t2 is one period of the signal output from the function generator 8. If t1 and t2 are compared, and found to match, it is determined that the frequencies of both signals are the same.

However, because the number of rotations of the drive motor 7 varies depending on the number of sectors, the target periods are stored in a ROM storage device 12 for reference and comparison. The target periods, of course, correspond to the number of rotations of the drive motor 7 which is dictated by the number of sectors.

In addition, in the phase detection method, the time intervals ta in FIG. 5, measured from the leading edge to the trailing edge of the CAV control square wave signal, and the time interval tb, measured from the leading to the trailing edge of the function generator 8 output signal, are compared by means of an AND logical operator, and when ta=tc, it can be determined that the phases of both signals match.

However, because ta varies depending on the number of sectors, values of ta corresponding to each of the established number of sectors are stored in the ROM storage device 12, where they can be referenced to initiate a comparison.

Figure 6:
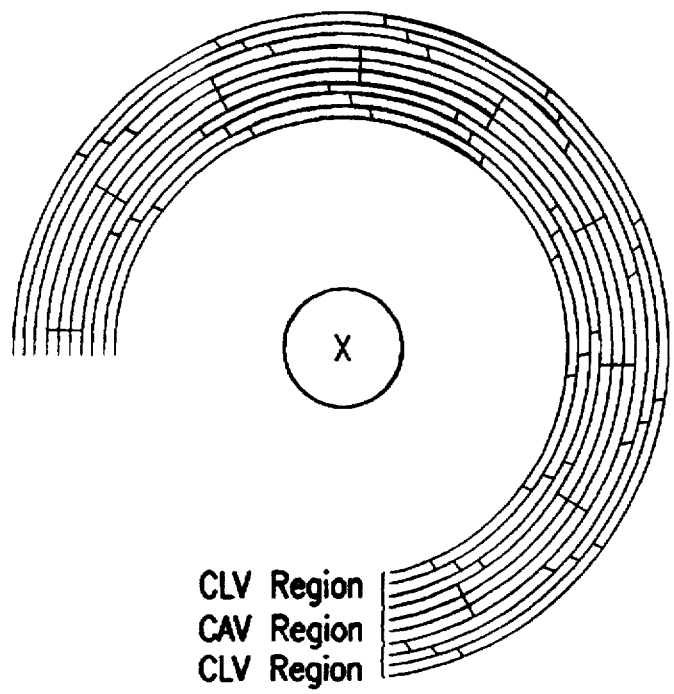
FIG. 6 shows an embodiment of an optical disk having both CAV and CLV regions according to the present invention.
Figure 7:
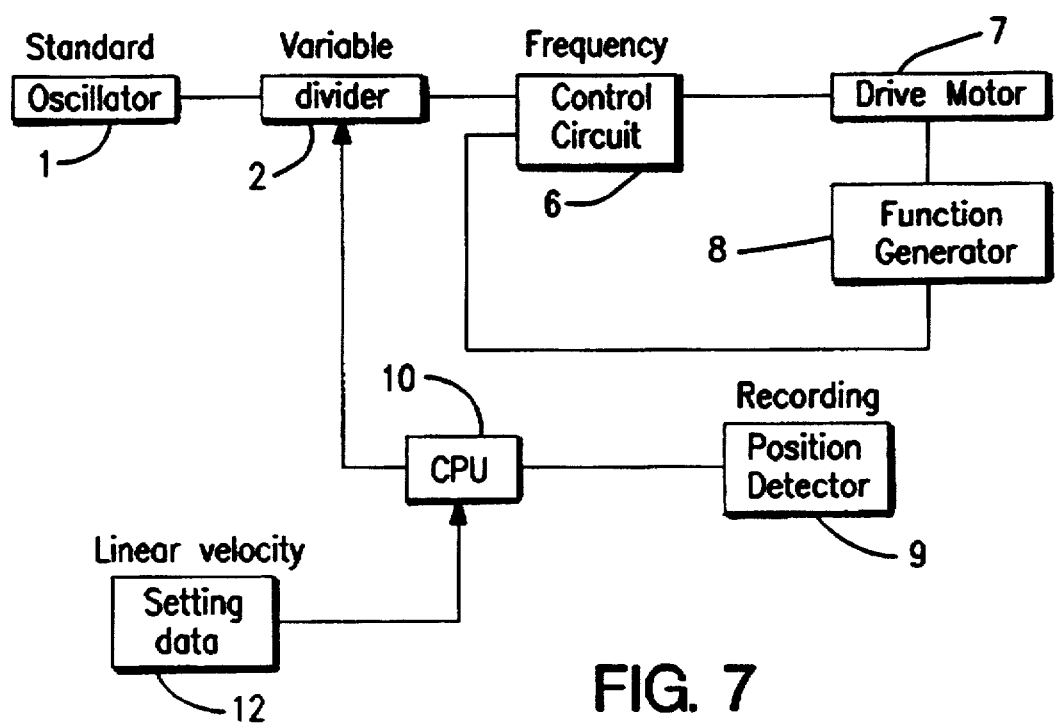
FIG. 7 is a block diagram of an optical disk recording device according to the prior art.

The concept of having both CAV regions and CLV regions on a single optical disk is shown in FIG. 6. Because it is possible to move from the CLV region to the CAV region without interruption of the data stream, information recording and playback using both control formats are possible without any interruption.

With the present invention, even when regions recording using CAV control are provided in an optical disk in which information is recorded with CLV control for the rotation control (or the reverse), data can be recorded in the direction of movement or in the reverse direction by means of CAV region from the CLV region, while maintaining the continuity of the data stream. In the CAV region, since the lead sector of each of the tracks can be disposed in the radial direction, discrimination between the two control regions may be accomplished.

Modifications of the invention herein disclosed will occur to a person skilled in the art and all such modifications are deemed to be within the scope of the invention as defined by the appended claims.

What is claimed is:

1. A method of switching control format from constant linear velocity CLV control format to constant angular velocity CAV control format and back to said CLV control format when recording information on an optical disk, said method comprising the steps of:
  establishing a division rate based on a number of sectors arranged per one circumference of a recording mark rows in a CAV region in said optical disk;
  recording information on said optical disk using said CLV control format;
  initiating a comparison of a frequency of a CLV control signal established by means of a first linear velocity data and a frequency of a CAV control signal determined by a number of sectors arranged per one circumference of recording mark rows in said CAV region in said optical disk established by a division rate;
  if said frequency of said CLV control signal and said frequency of CAV control signal match, initiating a comparison of a phase of said CLV control signal and a phase of CAV control signal;
  if said phase of said CLV control signal and said phase of said CAV control signal match, switching a control format from said CLV control format to said CAV control format;
  halting frequency and phase comparisons;
  switching linear velocity data from said first linear velocity data to a second linear velocity-data;
  initiating a time delay;
  after said time delay, initiating a comparison of a frequency of said CAV control signal and a frequency of CLV control signal;
  if said frequency of said CAV control signal and said frequency of CLV control signal match, initiating a comparison of phase of said CAV control signal and said phase of said CLV control signal;
  if said phase of said CAV control signal and said phase of said CLV control signal match, switching control format from said CAV control format to said CLV control format; and
  halting frequency and phase measurements.

2. The method of switching control format according to claim 1, wherein said comparison steps are carried out by frequency and phase comparison means, said comparison means generating a control signal controlling a second switching means to carry out said linear velocity data switching step and first and third switching means to carry out said step of switching control format from said CLV control format to said CAV control format and said step of switching control format from said CAV control format to said CLV control format.

* * * * *